(12) United States Patent
Wagener

(10) Patent No.: US 7,448,885 B2
(45) Date of Patent: Nov. 11, 2008

(54) DEVICE OR CONNECTION ADAPTER
(75) Inventor: Hans Wagener, Dietzhölztal (DE)
(73) Assignee: Rittal GmbH & Co. KG, Herborn (DE)
( * ) Notice: Subject to any disclaimer, the term of this patent is extended or adjusted under 35 U.S.C. 154(b) by 0 days.
(21) Appl. No.: 11/667,749
(22) PCT Filed: Feb. 10, 2006
(86) PCT No.: PCT/EP2006/001255
§ 371 (c)(1),
(2), (4) Date: May 15, 2007
(87) PCT Pub. No.: WO2006/094599
PCT Pub. Date: Sep. 14, 2006

(65) Prior Publication Data
US 2008/0038947 A1 Feb. 14, 2008

(30) Foreign Application Priority Data
Mar. 4, 2005 (DE) .................. 10 2005 009 992

(51) Int. Cl.
H01R 25/00 (2006.01)
(52) U.S. Cl. ..................................... 439/116
(58) Field of Classification Search ................. 439/532, 439/212, 110–118, 121, 122, 681, 949, 207, 439/718, 76.2; 174/149 B, 70 B, 68.2, 88 B, 174/99 B, 72 B; 361/361, 355, 358
See application file for complete search history.

(56) References Cited
U.S. PATENT DOCUMENTS
4,646,199 A 2/1987 M'Sadoques et al.
4,916,574 A * 4/1990 Hancock et al. ............. 361/649
5,938,461 A * 8/1999 Biermeier et al. ........... 439/212
2006/0035517 A1 2/2006 Wagener FOREIGN PATENT DOCUMENTS
DE G 93 06 013.0 5/1994
DE 19714839 C1 * 4/1998
DE 100 61 939 A1 6/2002
DE 103 00 723 A1 7/2004

* cited by examiner

Primary Examiner—Edwin A. León
(74) Attorney, Agent, or Firm—Pauley Petersen & Erickson

(57) ABSTRACT

A device or connection adapter having a base part, in which contact-making units with connection contacts are accommodated for making electrical contact with busbars of a busbar system, and having a holding apparatus for detachably fixing the device adapter with respect to the busbar system. Given a simple design and simple operation, variable coupling options are provided if the holding apparatus has different, modular connections and clamping feet, at least some of which can be fitted detachably to the base part, in order to mechanically fix the device adapter either to a supporting apparatus of the busbar system or directly to at least one busbar.

21 Claims, 5 Drawing Sheets

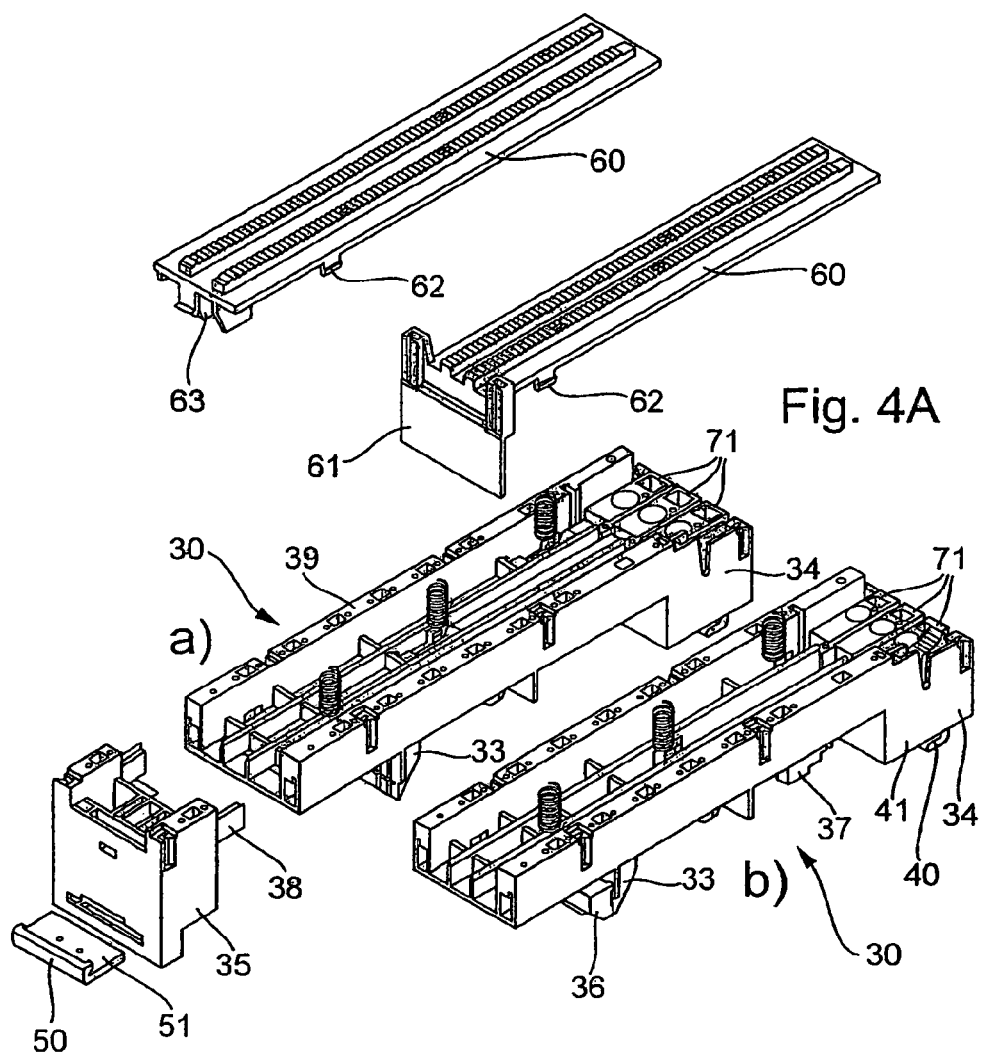

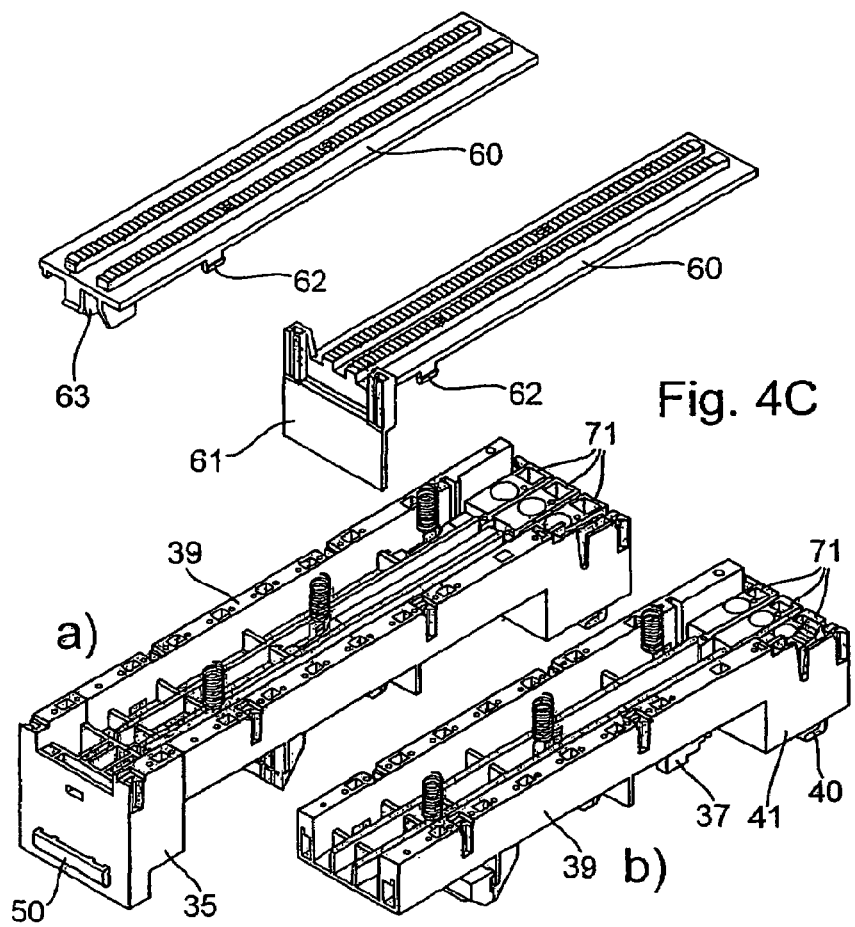
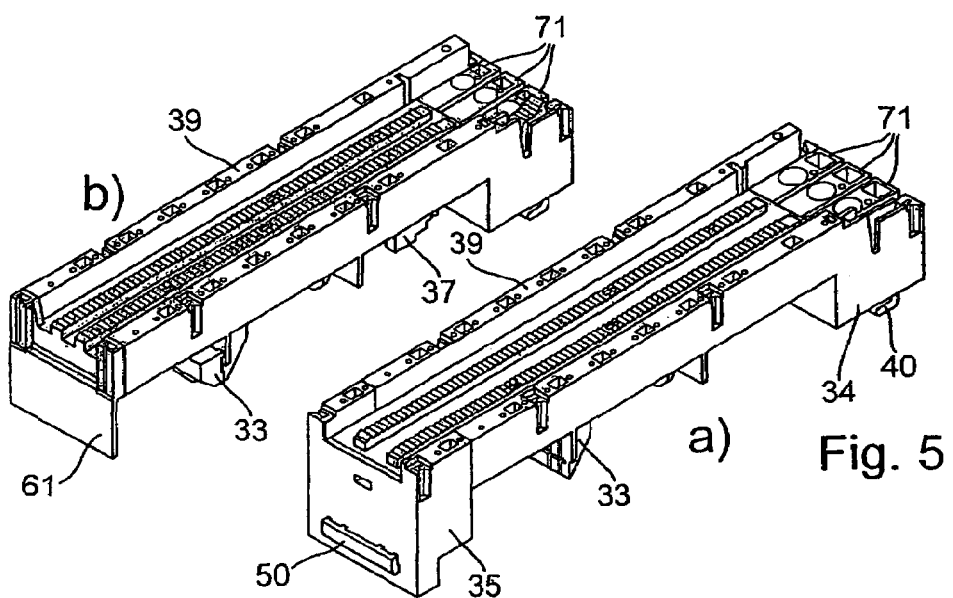
Fig. 4C
Fig. 5

DEVICE OR CONNECTION ADAPTER

BACKGROUND OF THE INVENTION

1. Field of the Invention

This invention relates to a device or connector adapter, having a base element, in which contacting units with contacts for making electrical contact with bus bars of a bus bar system are received, and having a holding device for releasable fixation in place of the device adapter with respect of the bus bar system, as well as the use of the adapter.

2. Discussion of Related Art

Device or connector adapters have been known in various designs, such as in connection with bus bar systems with mounting units, such as shown in German Patent References DE 103 00 723 A1, DE 93 06 013 U1 and DE 100 61 939 A1, where the connector and/or snap-in elements are formed in one piece on the bus bar holders, on the platform of the mounting unit and on the device or connector adapters and are only used for mechanically connecting mounting units and device or connector adapters matched to each other. This considerably narrows the range of employment of the adapters. For example, an installed system with a mounting unit laid out in a defined manner cannot be connected to different device or connector adapters.

SUMMARY OF THE INVENTION

It is one object of this invention to provide a device or connector adapter with increased application and variation range, and to disclose an advantageous employment possibility.

This object is attained by a device or connector adapter having characteristics discussed in the specification and the claims. The holding device has various module-like connecting devices and clamping feet which can be attached, at least in part releasably, on the base element, in order to mechanically fix the device adapter in place, selectively on a support device of the bus bar system, or directly on at least one bus bar.

It is thus possible, along with a simple mounting and simple operation, to mechanically connect the adapter having the same base element and simple-to-connect different connecting elements selectively directly with the bus bars, or with a platform receiving the bus bars, wherein a dependable electrical contact is assured.

One advantage of this invention results from the use of such a device or connector adapter in connection with a bus bar system with a mounting unit, which contains several spaced-apart bus bars in insulated bus bar holders, or an insulating platform.

In one embodiment of the adapter, a portion of the connecting device is attached on a narrow side of the elongated and approximately cube-shaped base element, and a further portion of the connecting device is attached on the oppositely located side of the base element, and the connecting device on at least one narrow side has snap-in elements. The connecting device being matched to each other on the two narrow sides of the adapter result in simple manipulation during attachment and a dependable connection.

For a connection, for example on the edges of a trough-shaped receptacle of the platform, the oppositely located connecting device on both narrow sides of the device adapter has connecting sections which are facing each other or away from each other.

Furthermore, in case of different utilization, steps are advantageous for the mounting and operation, wherein the connection device on at least one narrow side of the device adapter is attached to a attachment piece which is or can be releasably connected with the base element.

In this embodiment, for example, in the connected state the at least one attachment piece is snapped together, plugged together and/or screwed together with the base element.

For mounting and manipulating, those steps can be advantageous wherein, on a narrow side of the device adapter, the connecting device is connected in one piece with the base element via a narrow side section formed thereon.

For simple fixation in place on at least one bus bar, the at least one clamping leg in a hook shape is or can be releasably attached for extending behind the associated bus bar, or a section of the same, at the appropriate underside of the base element.

In this case, the connection of the clamping leg can occur in a simple way because the at least one clamping leg is snapped, screwed and/or plugged into a wall attachment formed on the underside of the base element.

A further advantage can be achieved if the wall attachment laterally borders a bus bar receptacle on the underside of the base element.

Those measures contribute to a dependable fixation in place of the adapter on bus bars wherein, for the lateral delimitation of a side of a bus bar to be assigned which is located opposite a side facing the wall attachment, a locking element, which is seated in the base element and which can be displaced or pivoted perpendicularly with respect to the underside of the base element, projects into at least one bus bar receptacle.

Mounting and operation can be favored if the locking element can be removed.

The mechanical fixation in place, as well as the provision of electrical contacts at the bus bars, can be aided if the contacts are resiliently supported in the base element for making an electrical contact with the bus bars.

For the rapid and simple establishment of the mechanical connection when using the adapter, the connecting elements of the device or connector adapters, which are embodied as snap-in elements, can be cushioned in the device or connector adapter and can be adjusted in a limited way parallel with the fastening surface of the mounting unit and perpendicular in relation to the bus bars. The snap-in elements of the device or connector adapter, which are provided with a snap-in ramp and a snap-in tip, snap into a snap-in receptacle of the platform of the mounting unit or snap-in receptacle of the bus bar holder when the device or connector adapter is placed on the mounting unit.

BRIEF DESCRIPTION OF THE DRAWINGS

This invention is explained in view of exemplary embodiments represented in the drawing, wherein:

FIGS. 4A, 4B and 4C each shows a different perspective view of two differently designed adapters in different exploded views; and FIG. 5 shows an assembled state of each of two differently assembled adapters in accordance with FIGS. 4A to 4C.

DETAILED DESCRIPTION OF THE INVENTION

Figure 1:
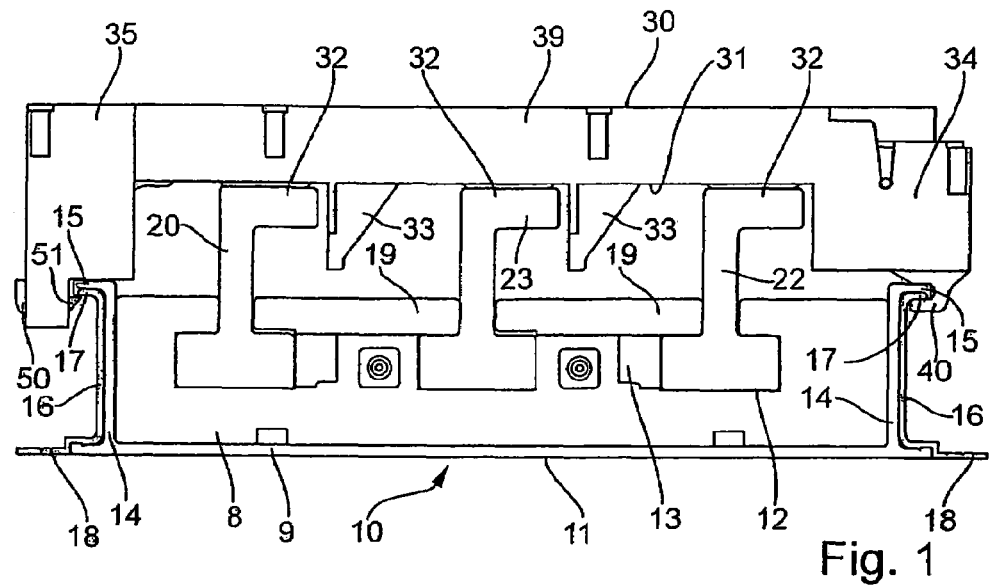
FIG. 1 is a lateral view of a bus bar system including a mounting unit with a platform and a connection adapter placed on top of the platform and maintained thereon.

As the exemplary embodiment of FIG. 1 shows, three spaced-apart bus bars 20 are fixed in place in an insulated manner. In this case, the platform 11 can have a sort of a trough 9 and can extend over an entire length of the bus bars 20. The platform 11 can also be equipped with several insulating bus bar holders 8 arranged on the trough 9, or can be replaced by several insulating bus bars, which are spaced apart from each other in the longitudinal direction of the bus bars 20. Connecting elements 14 and 16 are attached to the sides of the trough, or platform 11, which extend parallel with the bus bars 20 wherein, facing the device adapter 30, the connecting elements 14 and 16 terminate in plug elements in the form of holding sections 15 and 17, which for example are oriented toward the outside parallel with the fastening surface of the trough 9. In this case, the fixation on a support is provided, for example, via fastening flanges 18 of the connection elements 16. In a similar way, the holding sections 15 and 17 can also be formed by outwardly angled end sections of the narrow trough edges. In accordance with FIG. 1, the fastening of the device adapter 30 is provided at the holding sections 15, 17 on the one side by a hook-like connecting element 40, and on the other side by a releasable connector or connecting means 50 which, for example, can be snapped in and has a snap-in projection 51 on an attachment piece 35 on the appropriate narrow side of the device adapter 30, as FIGS. 1 and 3 show.

Figure 2:
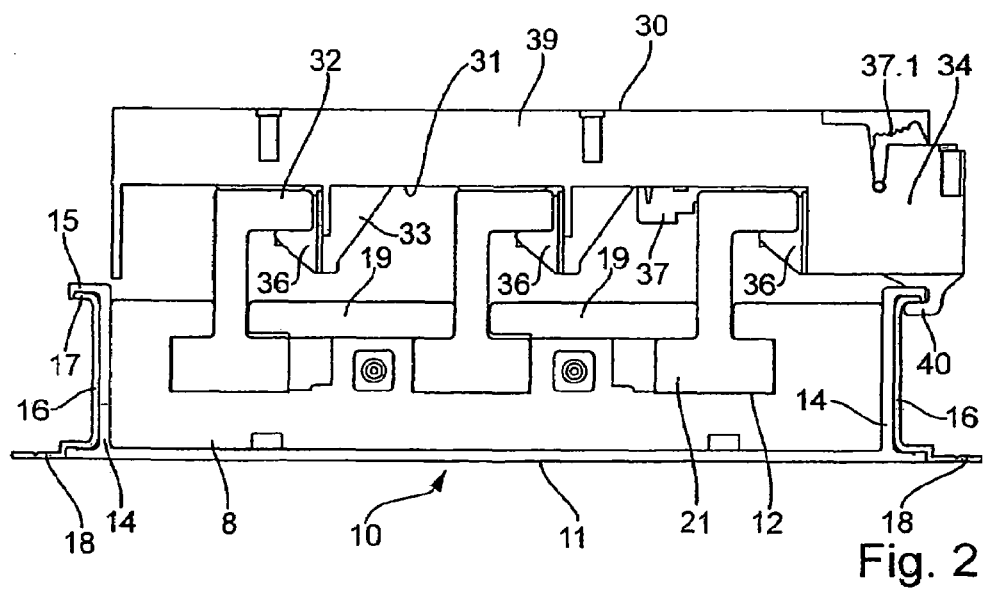
FIG. 2 is a lateral view of a bus bar system in accordance with FIG. 1, wherein the connection adapter is maintained on bus bars.
Figure 2A:
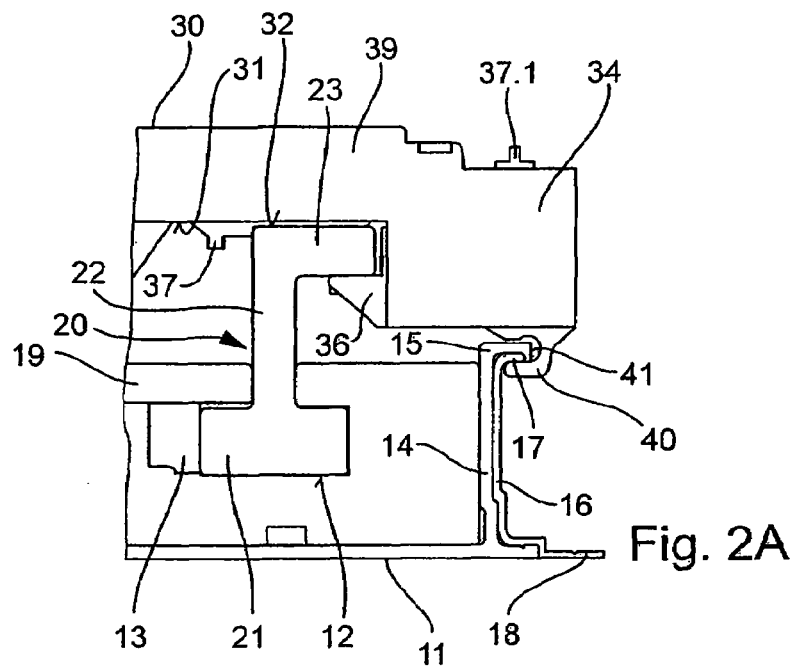
FIG. 2A is a partial enlarged view of the bus bar system in accordance with FIG. 2, with a modified locking element and the fixation of the adapter on a bus bar, as well as an attachment on a platform on one side.

In the present case, a foot 21 of the bus bars 20 is inserted into receptacles 12 of the bus bar holders 8 or of the platform 11, wherein filler pieces 13 fill up the receptacles, and cover plates 19 fix the feet 21 and the filler pieces 13 in place. The bus bars 20 project outward by sections 22 and 23 in an L-shape at the top of the mounting unit 10. On the side facing the mounting unit 10, the device or connector adapter 30 has three bus bar receptacles 31, into which the electrical contact elements 32 project. The wall attachments 33 divide the bus bar receptacles 31 and can have removable clamping feet 36, such as shown in FIG. 2, which extend behind the end sections 23 of the bus bars 20. The clamping feet 36 can be snapped into place in the device or connector adapter 30. In this case, a spring-loaded locking element 37 can project into at least one bus bar receptacle 31, besides the contact element 32, as shown in FIGS. 2, 2A and 3. The locking element 37 is placed behind the transition from the end section 23 to the section 22 of the bus bar 20 and assures that the device or connector adapter 30 is maintained on the mounting unit 10 even if no lock or locking means 51, such as for example the connecting device or connecting means 50, are provided for securing on the platform 11 or the bus bar holders 8. If a locking means for securing on the platform 11 is provided, the additional locking element 37 can be omitted, as shown in FIG. 1. Flat bus bars can also be used.

As the left side of FIGS. 1 and 2 and the enlarged partial view in accordance with FIG. 2A show, following the plug-in movement the plug elements 15 and 17 of the connecting elements 14 and 16 are introduced into the connecting element 40 at the device or connector adapter 30 and a mechanical connection between the mounting element 10 and the device or connector adapter 30 is achieved. In this case, the connecting element 40 can be attached fixedly, or releasably and exchangeably, to the narrow side end 34 of the device or connector adapter 30. This mechanical connection assures that the device or connector adapter 30 is securely fixed in place with respect to the fastening surface of the mounting unit 10.

Figure 3:
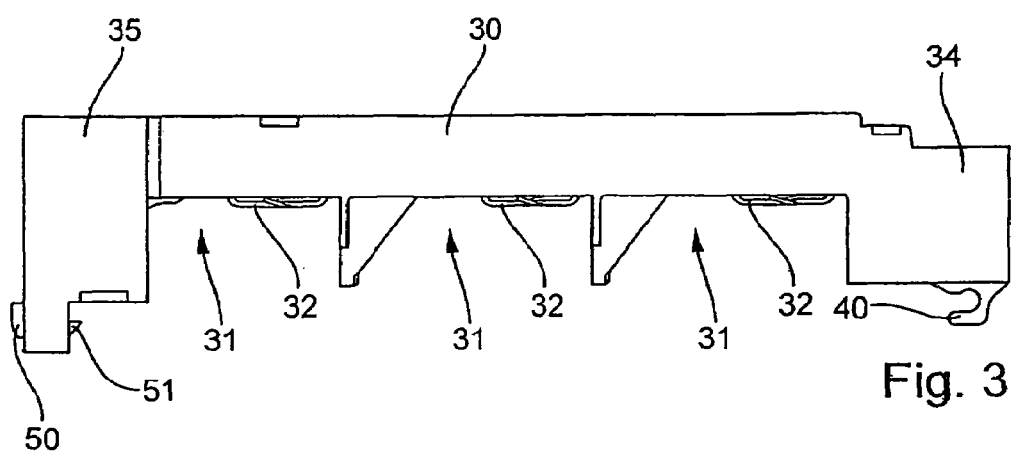
FIG. 3 is a top view of the connection adapter in accordance with FIG. 1.

As shown in FIGS. 1 and 3, the narrow side end of the device or connector adapter 30 located opposite the narrow side, or the narrow side section 34 with the connecting element 40, supports the attachment piece 35. As a connector or connecting means, the attachment piece 35 has a snap-in element 50 with a snap-in ramp for deflection during placement, and a snap-in projection 51 for holding in the inserted state. The snap-in element 50 is resiliently seated in the attachment piece 35 and can be displaced in a limited way substantially parallel with respect to the fastening surface of the mounting unit 10 and perpendicularly with respect to the long sides of the bus bars 20. If the connecting element 40 is placed or hooked on the flange-like holding sections 15 and 17 of the mounting unit 10 by a sideward movement, it is then possible by a pivot movement to deflect the snap-in element 50 on the opposite side over the snap-in element 50 in such a way that the snap-in tip, or snap-in projection 51, is moved sideways and thereafter the associated holding section 17 is grasped from behind. In that case, the mechanical connection between the device or connector adapter 30 and the mounting unit 10 is assured in a simple manner. It can only be released by setting the snap-in element 50 back.

It still remains that a multitude of embodiment variations regarding the details of the connecting and/or snap-in elements can exist, as well as the releasable and interchangeable connection with the bus bar holders, the mounting unit and the device of connector adapters.

If as shown in FIGS. 2 and 2A, at least one clamping foot 36 is installed, and at least one adjustable locking element 37 is provided, it can be securely fixed in place on bus bars 20 without the connecting and/or snap-in elements 40, 50 being installed. This results in variable employment possibilities.

Figure 4B:
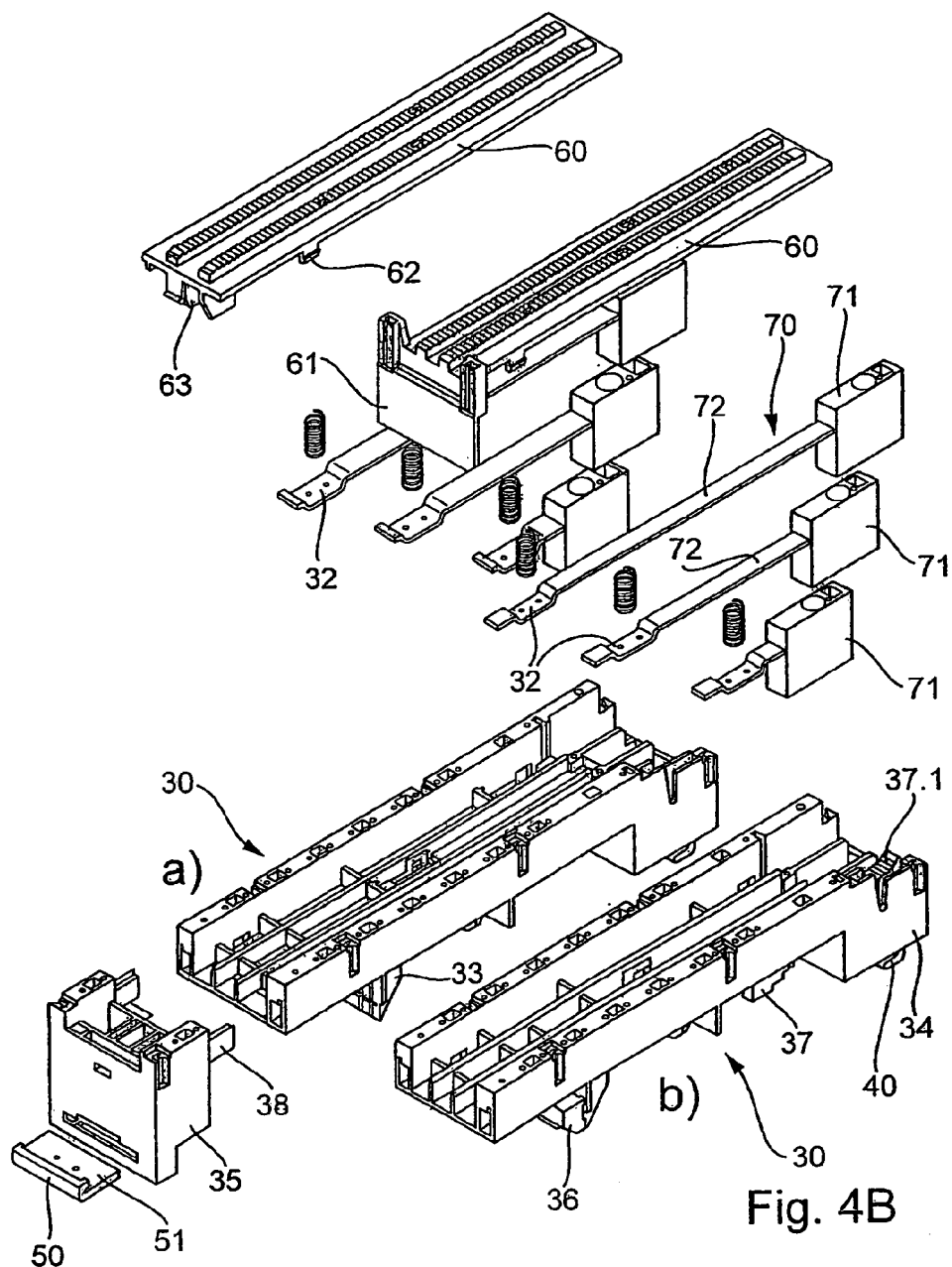

FIGS. 4A, 4B and 4C show two device adapters 30 embodied in different ways, having connector or connecting means 40, 50 and clamping feet 36, in various exploded views, always with the same base element 31, in a perspective view. FIG. 5 shows the two embodiments of the device adapter 30 in the assembled state, also in a perspective view.

The variations of the device adapter 30, which can only be fixed in place on the platform 11, such as with the holding sections 15, 17 which are outwardly angled on both sides, are here represented in the partial representations a), while the embodiment variations of the device adapter 30 which can be fixed in place on the bus bars 20 are shown in the partial representations b). As FIGS. 4A and 4B show, in particular, the connecting means equipped with the snap-in elements 50 are formed on the attachment piece 35 at its lower section facing the platform, wherein the snap-in element 50 with the snap-in projection 51 is inserted as a separate element into the slit-shaped cutout of the attachment piece 35 and is resiliently seated therein for lateral displacement parallel with the level of the platform 11 for producing and releasing the snap-in connection. In its upper section facing the respective narrow side of the base element 39, the attachment piece 35 has lateral plug-in pegs 38, which can be plugged into matched openings in the area of or near the longitudinal side elements of the base element 39 and fixed in place therein, for example snapped in. The narrow side section 34 on the opposite side of the base element 39 is formed as one piece with it and has on an underside the connecting element 40, also formed on it, with the hook-like plug-in receptacle 41 for the holding section 15, 16 matched to it. For connecting the device adapter 30 thus equipped on the platform 11, first the connecting element 40 is suspended on the respective holding section 15, 17 by a displacement movement in the direction of the level of the platform, and then the snap-in connection is provided on the opposite narrow side of the device adapter 30 at the appropriate holding section 15, 17 by a pivot movement, wherein the snap-in element 50 is pushed back against the spring force by the snap-in ramp on the snap-in projection 51, and then snaps into the snapped-in position under the spring force by extending it behind the holding section 15, 17.

Longitudinally extending receptacles for contact springs 72 are formed in the base element 39, which are connected with suitable conductors in connecting pieces 71 and together form a contacting unit 70. In this case, the connecting pieces 71 are received in matched recesses of the narrow side section 34, as shown in FIG. 4A and in FIG. 4B, as well as FIG. 4C. A set-up plate 60 is attached to the top of the base element 39, for which purpose snap-in springs 62 and snap-in hooks are formed on the underside of the set-up plate 60, which engage matching openings in the top of the base element 39. Further snap-in hooks 63 are designed so that they work together with the attachment piece 35. Helical springs on the underside of the set-up plate 60 are supported on the contact elements 32 of the contact springs 72, so that a dependable contact is provided on the bus bars 20 and during this the mechanical connection possibly made there is also aided. Further connectors or connecting means for receiving devices can be attached to the top of the set-up plate 60 or to strips laterally bordering it.

In connection with the variation of the device adapter 30 designed for attachment to the bus bars 20 in accordance with the partial representations b), the attachment piece 35 is not provided, which is also shown in FIG. 2. Instead, a cover plate 62 is formed, or removably attached, on the set-up plate 60 which, in place of the attachment pieces 35, forms a simple closure on the narrow side of the device adapter 30. This embodiment has the clamping feet 36 for fixation on the bus bars 20, which are releasably attached to the wall attachments 33 on the underside of the base element 39, for example snapped in, plugged in or screwed on. The clamping feet 36 can have inserted reinforcement elements. Fixation in place on the bus bars 20 is also reinforced by the helical springs on the contact elements 32 at the contact springs 72. The wall attachments 33 form lateral borders for received bus bars 20. At least one bus bar 20 is secured on its longitudinal side located opposite the wall attachment 33 by a locking element 37, which is seated, perpendicularly displaceable or pivotable in regard to the underside of the base element 39, and is pressed outward by a spring force. The locking element 37 has various settings for different widths of bus bars and can be displaced inward against the spring force by a handle 37.1 in the top of the narrow side section 34 by a pivot movement or a displacement movement parallel with the longitudinal orientation of the base element 30 via a snap-in ramp in order to unlock the adapter 30. The locking element 37 and, if required also the handle 37.1, can be taken out of the base element, or introduced into it as separate parts.

The invention claimed is:

1. A device or connector adapter (30), having a base element (39) in which contacting units (70) with contact elements (32) for making electrical contact with bus bars (20) of a bus bar system are received, and having a holding device for releasable fixation in place of the device adapter (30) with respect to the bus bar system, the device or connector adapter comprising:

the holding device having various module-like connecting means (40, 50) and clamping feet (36) which are attachable, releasable at least in part, on the base element (39) in order to mechanically fix the device adapter (30) in place one of selectively on a support device of the bus bar system and directly on at least one bus bar (20), wherein the adapter is in a bus bar system having a mounting unit (10), which receives a plurality of spaced-apart bus bars in insulating bus bar holders of an insulating platform (11), and the connecting elements (50) of the adapter (30), which is embodied as snap-in elements, are cushioned in the adapter (30) and are adjustable in a limited way parallel with the fastening surface of the mounting unit (10) and perpendicularly relative to the bus bars (20), and the snap-in elements (50) of the adapter (30) having a snap-in ramp and a snap-in tip (51), snap into one of a snap-in receptacle of the platform (11) of the mounting unit (10) and a snap-in receptacle of the bus bar holder (8) when the device or connector adapter (30) is placed on the mounting unit (10).

2. The adapter in accordance with claim 1, wherein the oppositely located connecting means (40, 50) on both narrow sides of the device adapter (30) have connecting sections one of facing each other and facing away from each other.

3. The adapter in accordance with claim 1, wherein the connecting means (50) on at least one narrow side of the device adapter (30) is attached to an attachment piece (35) which is releasably connectable with the base element (39).

4. The adapter in accordance with claim 1, wherein on a narrow side of the device adapter (30) the connecting means (40) is connected in one piece with the base element (39) via a narrow side section (34) thereon formed.

5. The adapter in accordance with claim 1, wherein the at least one clamping leg (36) is releasably attachable in a hook shape for extending behind the associated bus bar (20) at the appropriate underside of the base element (39).

6. The adapter in accordance with claim 1, wherein for making an electrical contact with the bus bars (20), the contact elements (32) are resiliently supported in the base element (39).

7. The adapter in accordance with claim 1, wherein a portion of the connecting means (40) is attached on a narrow side of the base element (39) which is elongated and approximately cube-shaped, and a further portion of the connecting means (50) is attached on the oppositely located side of the base element (30), and the connecting means (50) has snap-in elements on at least one narrow side.

8. The adapter in accordance with claim 7, wherein the oppositely located connecting means (40, 50) on both narrow sides of the device adapter (30) have connecting sections one of facing each other and facing away from each other.

9. The adapter in accordance with claim 8, wherein the connecting means (50) on at least one narrow side of the device adapter (30) is attached to an attachment piece (35) which is releasably connectable with the base element (39).

10. The adapter in accordance with claim 9, wherein in a connected state the at least one attachment piece (35) is at least one of snapped together, plugged together and screwed together with the base element (39).

11. The adapter in accordance with claim 10, wherein on a narrow side of the device adapter (30) the connecting means (40) is connected in one piece with the base element (39) via a narrow side section (34) thereon formed.

12. The adapter in accordance with claim 11, wherein the at least one clamping leg (36) is releasably attachable in a hook shape for extending behind the associated bus bar (20) at the appropriate underside of the base element (39).

13. The adapter in accordance with claim 12, wherein the at least one clamping leg (36) is at least one of snapped, screwed and plugged into a wall attachment (33) formed on an underside of the base element (39).

14. The adapter in accordance with claim 13, wherein the wall attachment (33) laterally borders a bus bar receptacle (31) on the underside of the base element (39).

15. A device or connector adapter (30), having a base element (39) in which contacting units (70) with contact elements (32) for making electrical contact with bus bars (20) of a bus bar system are received, and having a holding device for releasable fixation in place of the device adapter (30) with respect to the bus bar system, the device or connector adapter comprising:

the holding device having various module-like connecting means (40, 50) and clamping feet (36) which are attachable, releasable at least in part, on the base element (39) in order to mechanically fix the device adapter (30) in place one of selectively on a support device of the bus bar system and directly on at least one bus bar (20), wherein a portion of the connecting means (40) is attached on a narrow side of the base element (39) which is elongated and approximately cube-shaped, and a further portion of the connecting means (50) is attached on the oppositely located side of the base element (30), and the connecting means (50) has snap-in elements on at least one narrow side, the oppositely located connecting means (40, 50) on both narrow sides of the device adapter (30) have connecting sections one of facing each other and facing away from each other, the connecting means (50) on at least one narrow side of the device adapter (30) is attached to an attachment piece (35) which is releasably connectable with the base element (39), in a connected state the at least one attachment piece (35) is at least one of snapped together, plugged together and screwed together with the base element (39), on a narrow side of the device adapter (30) the connecting means (40) is connected in one piece with the base element (39) via a narrow side section (34) thereon formed, the at least one clamping leg (36) is releasably attachable in a hook shape for extending behind the associated bus bar (20) at the appropriate underside of the base element (39), the at least one clamping leg (36) is at least one of snapped, screwed and plugged into a wall attachment (33) formed on an underside of the base element (39), the wall attachment (33) laterally borders a bus bar receptacle (31) on the underside of the base element (39), and for lateral delimitation of a side of a bus bar (20) to be assigned, which is located opposite a side facing the wall attachment (33), a locking element (37) seated in the base element (39) and one of displaceable and pivotal perpendicularly with respect to the underside of the base element (39) projects into at least one bus bar receptacle (31).

16. The adapter in accordance with claim 15, wherein the locking element (37) is removable.

17. The adapter in accordance with claim 16, wherein for making an electrical contact with the bus bars (20), the contact elements (32) are resiliently supported in the base element (39).

18. The adapter in accordance with claim 17, wherein the adapter is in a bus bar system having a mounting unit (10), which receives a plurality of spaced-apart bus bars in insulating bus bar holders of an insulating platform (11).

19. The adapter in accordance with claim 18, wherein the connecting elements (50) of the adapter (30), which is embodied as snap-in elements, are cushioned in the adapter (30) and are adjustable in a limited way parallel with the fastening surface of the mounting unit (10) and perpendicularly relative to the bus bars (20), and the snap-in elements (50) of the adapter (30) having a snap-in ramp and a snap-in tip (51), snap into one of a snap-in receptacle of the platform (11) of the mounting unit (10) and a snap-in receptacle of the bus bar holder (8) when the device or connector adapter (30) is placed on the mounting unit (10).

20. The adapter in accordance with claim 15, wherein the adapter is in a bus bar system having a mounting unit (10), which receives a plurality of spaced-apart bus bars in insulating bus bar holders of an insulating platform (11).

21. The adapter in accordance with claim 20, wherein the connecting elements (50) of the adapter (30), which is embodied as snap-in elements, are cushioned in the adapter (30) and are adjustable in a limited way parallel with the fastening surface of the mounting unit (10) and perpendicularly relative to the bus bars (20), and the snap-in elements (50) of the adapter (30) having a snap-in ramp and a snap-in tip (51), snap into one of a snap-in receptacle of the platform (11) of the mounting unit (10) and a snap-in receptacle of the bus bar holder (8) when the device or connector adapter (30) is placed on the mounting unit (10).

* * * * *